Aug. 31, 1948. O. W. LOUDENSLAGER ET AL 2,448,269
BALLOON SUSPENSION PATCH
Filed March 1, 1946 2 Sheets-Sheet 1
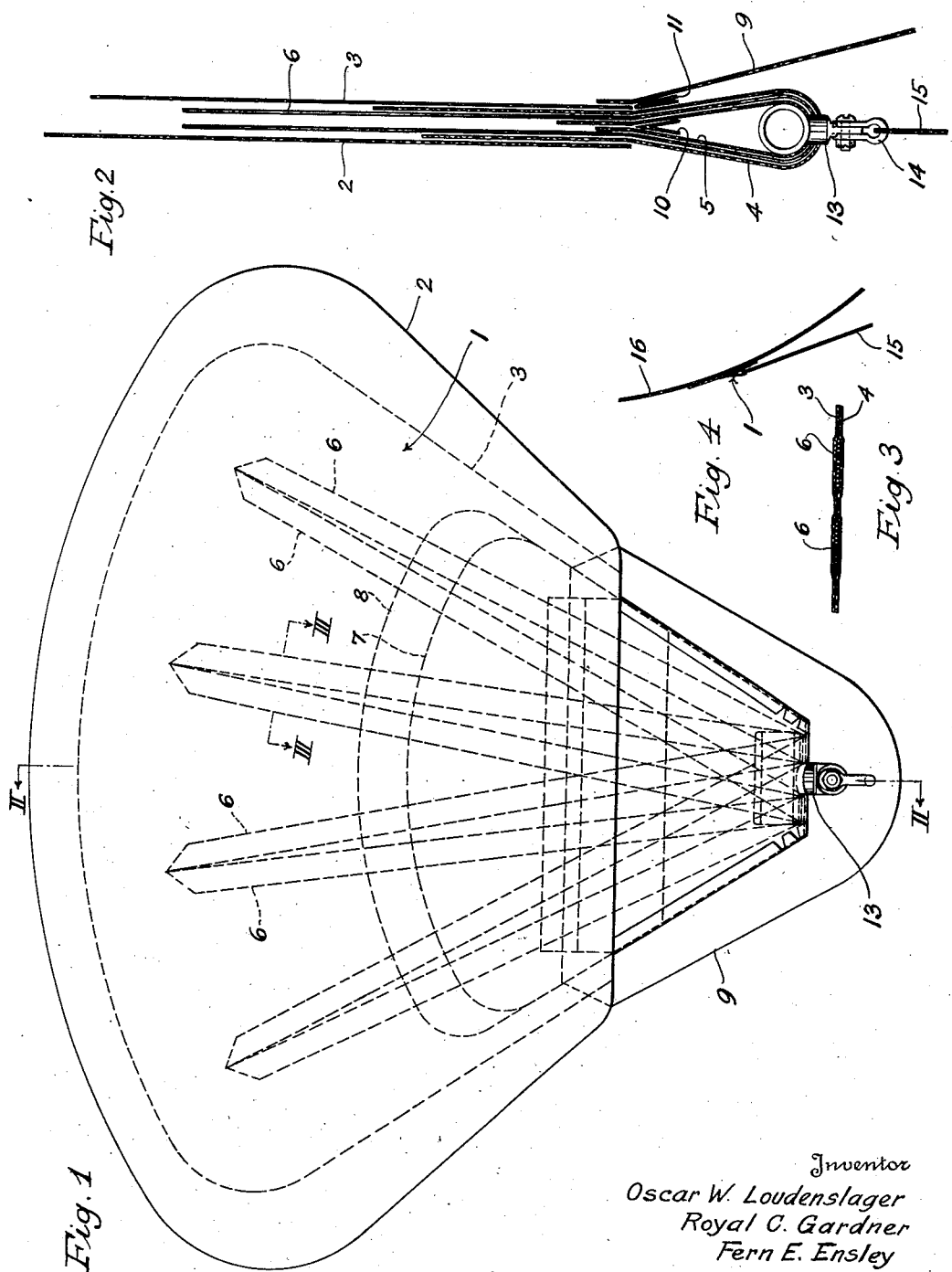
Inventor
Oscar W. Loudenslager
Royal C. Gardner
Fern E. Ensley

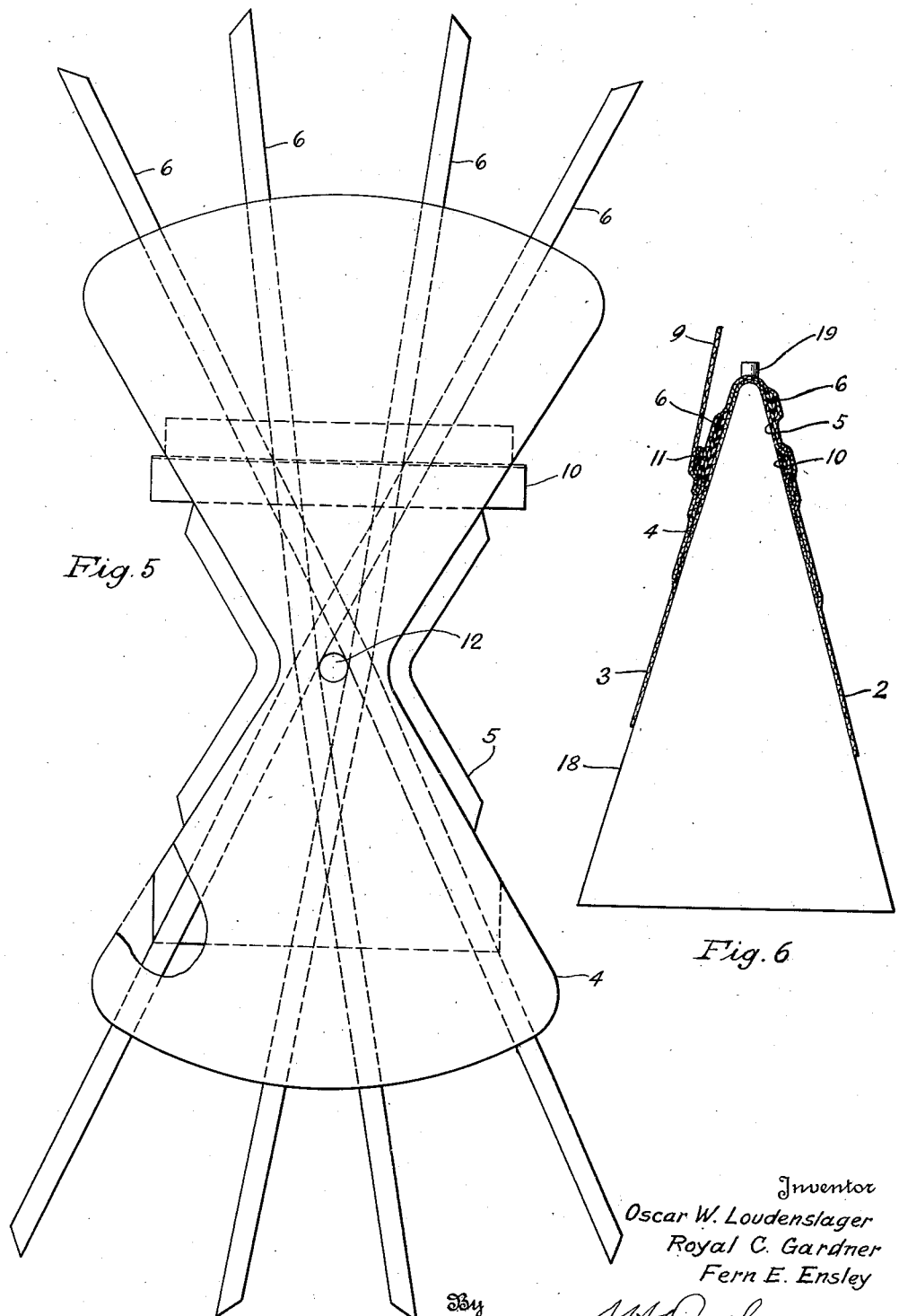

Patented Aug. 31, 1948

2,448,269

UNITED STATES PATENT OFFICE 2,448,269

BALLOON SUSPENSION PATCH

Oscar W. Loudenslager, Royal C. Gardner, and Fern E. Ensley, Akron, Ohio, assignors to Goodyear Aircraft Corporation, Akron, Ohio, a corporation of Delaware Application March 1, 1946, Serial No. 651,258

5 Claims. (Cl. 244—127)

1

This invention relates to lighter-than-air craft, particularly of the non-rigid type like blimps, captive balloons, but also adaptable to other fabric container inflatable with gas, liquids, etc., and more especially to the construction of cable suspension patches therefor, and to the apparatus for, and method of making same.

Formerly suspension patches for this purpose were made by fraying the ends of manila rope which were cemented between fabric and attached to the airship envelope. Handling lines, brace wires, etc., were attached to the unfrayed portion of the rope. The rope in such patches disintegrated rapidly under tropical weather conditions. In another construction the rope was replaced by tapes made of cord fabric, that is, fabric in which the threads or cords run in only one direction and are held together by rubber, similar to that used for automobile tires. These tapes intersecting each other in X-shape were folded at their intersection to form a loop for holding a suspension cable toggle and sandwiched between rubberized fabric patches. However, due to the fact that a hole had to be provided in the loop for inserting the toggle the tapes had to be made so much wider to compensate for the width of the hole. This greater width not only involved more material, but also more weight for the tapes, as well as for the toggle, which was objectionable.

It is the general object of the invention to avoid and overcome the foregoing and other difficulties of and objections to prior art practices by the provision of a lighter and more compact construction.

Another object of the invention is a better force distribution over the patch surface in the balloon envelope. Another object of the invention is to save material and to pre-form the suspension loop to obtain greater strength efficiency.

The aforesaid objects of the invention, and other objects which will become apparent as the description proceeds are achieved by using tapes of at least twice the number, but of smaller width than used formerly. In order to avoid the necessity of a hole in the tapes, the tapes are laid substantially tangentially to the hole through which the toggle for suspending the cable passes and are fan-like distributed over the patch surface. Furthermore, the parts of the patch making up

2 the loop-portion are pre-formed over an apparatus to a shape being as close as possible to that of the finished product to avoid unequal stretch of the various tapes under load.

Fig. 1 is a plan view of the patch assembly; Fig. 2 is a cross-sectional view taken on line II—II of Fig. 1 with the adjoining parts of the assembly shown spaced apart for clearer understanding, but which on the finished product are cemented together; Fig. 3 is a cross-sectional view taken on line III—III of Fig. 1; Fig. 4 is a fragmentary cross-sectional view of a balloon showing the patch attached thereto; Fig. 5 is a view in developed condition of the patch partially assembled showing the suspension tapes in their positions relative to each other and to the inner or looped patch members; and Fig. 6 is an end view of a form having a length at least equal to the width of the patch assembled, over which the parts of the patch, shown in section, are formed.

With specific reference to the form of the invention illustrated in the drawing the numeral 1 indicates the suspension patch as a whole, the material of which may consist of rubberized cotton, nylon, Fortisan or equivalent fabric, including an outside patch member 2 and a somewhat smaller patch member 3 opposite thereof and facing the balloon surfaces, both having their bottom edges substantially flush with each other. Partly sandwiched between these patches are smaller patches 4 and 5 folded into a loop and between which are inserted tension tapes 6, made of cord fabric which are also folded around the loop and extend with their end portions considerably beyond the circular edges 7 and 8 of the patch 4 between the patches 2 and 3. All these parts are united together by self-curing cement in the usual way. To the bottom of patch member 3 is cemented a chafing patch 9, and shoes 10 and 11 having V-shaped cross section are inserted at the corners formed by the looped patch member 5, and between the looped patch member 4 and the chafing patch 9, respectively, to prevent tearing loose of the cemented joints therebetween. The arrangement of the tapes 6 in relation to the patch members is best shown, in developed condition, in Fig. 5 in which two pairs of tapes pass tangentially a hole 12 in the patches 4 and 5 for inserting therein a toggle 13 in which is swingable a shackle 14 holding a suspension cable 15. Each pair of tapes forming an X of smaller and wider spread, respectively, in such a way that in folded condition the ends of one pair at one side of the patch are placed between and adjacent the ends of the same pair at the other side of the patch, as shown in Figure 1. Thus, the tapes are fanning out from near the hole 12 over the patch and provide a more uniform load distribution on a balloon envelope 16 than was the case with prior constructions.

For obtaining the best possible product and for better utilizing the strength of the material the original method of pre-assembling the patch on a flat table was abandoned and, instead, a form 18 is now being used. This form, shown in end view in Fig. 6, has the cross-section shape of an inverted V and a length at least equal to the greatest width of a patch assembly. The apex of the form is rounded by a radius corresponding substantially to that of the toggle bar. However, instead of making the sides of the form tapered, as shown, they may be moved together until they are substantially parallel, if so desired, so that a pre-formed loop requires least final bending for completing a patch. This assembling form 18, to be made of wood, metal, or any suitable material, is provided at its apex in the center longitudinally thereof with a registering pin 19 for centering the patches 5 and 4 and for properly placing the tapes for which purpose, in addition, the direction of the tapes, as best shown in Fig. 5, is also permanently marked in lines on both sides of the form 18, as will be easily understood without showing a side view of the form.

In making the patch assembly, all its parts are previously cut to dimension and provided, where necessary, with self-curing rubber cement. Then, the innermost patch 5, already provided with a shoe 10 cemented to one side thereof, is placed on the form over the pin 19 which is followed by laying the tapes 6 thereover in the position as marked on the form, and to be cemented to patch 5. Now, patch 4, if so desired, already provided with a shoe 11 is placed over the pin and cemented to patch 5, and to the tapes 6. The attachment of the outer patches 2 and 3 to patch 4 and to the tapes 6, and the chafing patch 9 to the patches 3 and 4 concludes the assembling process over the form, whereupon the loop is completed by cementing adjoining faces of the patch together. By this process deformation of the loop from its pre-formed state into the final shape is very slight and, therefore, does not impair the strength of the tapes, as is the case when bending the assembled parts from a straight plane into a loop.

It is to be understood that all references made in the specification, as well, as well as in the following claims, to rubber and rubberized fabric, shall include not only natural rubber, but also synthetic rubber, like neoprene, Chemigum, and equivalents.

It will be recognized that the objects of the invention to obtain a cable suspension patch having a loop portion of smaller width and lower weight for a shorter and lighter toggle has been achieved by this construction, with the additional result of a more uniform load distribution over the patch surface and in the balloon envelope.

While in accordance with the patent statutes our best known embodiment of the invention has been illustrated and described in detail, it is to be particularly understood that the invention is not limited thereto or thereby, but that the inventive scope is defined in the appended claims.

We claim:

1. A patch for securing a cable, or the like, to a flexible fabric surface, or the like, and comprising a flexible fabric member, a T-shaped metal member, flexible rubberized tapes adapted to be secured at one end to said flexible fabric member at an acute angle to the upright of the T-member and looped over their middle portions around the cross bar of the T-member at one side of the upright and having their other ends adapted to be secured to said fabric member at an opposite acute angle to the upright of the T-member, said tapes being divided equally as to numbers on both sides of the upright of the T-member and fanning out from the top of the T-member to cover the greatest area on the fabric member, and means for holding the tapes supporting the T-member together in patch form.

2. A patch for securing a cable, or the like, to a flexible fabric surface, or the like, and comprising a plurality of flexible fabric members associated to form the base of the patch and being folded into a loop, a T-shaped metal member adapted to be inserted into said loop for attaching said cable thereto, flexible rubberized tapes sandwiched between said flexible fabric members and adapted to be secured at their one end to said flexible fabric members at an acute angle to the upright of the T-member at one side of the upright and having their other ends adapted to be secured to said fabric members at an opposite acute angle to the upright of the T-member, said tapes being divided equally as to numbers on both sides of the upright of the T-member and fanning out from the top of the T-member to cover the greatest area on said patch base.

3. A patch for securing a cable, or the like, to a flexible fabric surface, or the like, and comprising two opposite flat fabric members having their lower edges substantially flush and their remaining edge portions offset, looped fabric members including substantially straight portions extending from the loop in staggered length and being sandwiched between said flat fabric members, a T-shaped metal member adapted to be inserted into said loop for attaching said cable thereto, flexible rubberized tapes divided equally as to number on both sides of the upright of said T-member and laid between said looped fabric members and said flat fabric members and adapted to be secured at one end to all of said fabric members at an acute angle to the upright of the T-member at one side of the upright close thereto and having their other ends adapted to be secured to said fabric members at an opposite acute angle to the upright of the T-member, and fanning out from the top of the T-member to cover the greatest area on the fabric member.

4. A patch for securing a cable, or the like, to a flexible fabric surface, or the like, and comprising a plurality of fabric members forming the base of the patch having its middle portion shaped into a loop provided with a hole at its bottom, a T-shaped metal member inserted in said loop and extending from said hole, and at least four reinforcing tapes made of cord fabric sandwiched between said fabric members and united therewith for supporting said T-shaped member, said tapes being divided equally as to number on both sides of the upright of said T-member and placed substantially tangential thereto in such a way that the ends of each tape form acute angles with the upright of said T- shaped member and that opposite ends of each pair of tapes being symmetrical to the center of the patch come to lie between each other to cover the greatest area on said patch.

5. A patch for securing a cable, or the like, to a flexible fabric surface, or the like, and comprising a base fabric structure forming a loop, a T-shaped metal member supported by said loop and its upright extending therefrom for attachment of said cable, and at least four tension tapes of uniform width embedded in said base structure and substantially tangentially passing at both sides equally distributed as to number the upright of said T-member in such a way that opposite ends of a pair of tapes being symmetrical to the center of the patch come to lie between and adjacent each other forming acute angles in opposite direction to the upright of said T-member and radiating therefrom to cover the greatest area on said base structure.

OSCAR W. LOUDENSLAGER.
ROYAL C. GARDNER.
FERN E. ENSLEY.

REFERENCES CITED

The following references are of record in the file of this patent:

UNITED STATES PATENTS

| Number | Name | Date |
|---|---|---|
| 1,272,058 | Kraft | July 9, 1918 |
| 2,377,962 | Preston | July 12, 1945 |